United States Patent [19]

Bauer

[11] 4,343,452

[45] Aug. 10, 1982

[54] SPRING SUPPORT STRUT FOR DRUM-TYPE WASHING MACHINE

[75] Inventor: Fritz Bauer, Altdorf, Fed. Rep. of Germany

[73] Assignee: Suspa Federungstechnik Fritz Bauer & Shone Ohg, Altdorf, Fed. Rep. of Germany

[21] Appl. No.: 66,454

[22] Filed: Aug. 14, 1979

[30] Foreign Application Priority Data

Aug. 30, 1978 [DE] Fed. Rep. of Germany ....... 2837801

[51] Int. Cl.³ .......................................... F16M 13/00
[52] U.S. Cl. ................................... 248/565; 248/566; 248/569; 248/619
[58] Field of Search .............. 248/565, 566, 569, 619; 68/23.1; 188/1 B, 67

[56] References Cited

U.S. PATENT DOCUMENTS

| 949,962 | 2/1910 | Nichols | 248/566 |
|---|---|---|---|
| 1,211,077 | 1/1917 | Burton | 248/619 X |
| 1,285,980 | 11/1918 | Gilman | 188/67 X |
| 1,610,730 | 12/1926 | Baler | 248/161 X |
| 2,908,456 | 10/1959 | Gertel | 248/566 |
| 3,509,742 | 5/1970 | Bauer | 68/23.1 |
| 3,736,417 | 5/1973 | Williams | 248/317 X |
| 3,744,746 | 7/1973 | Weir et al. | 248/569 |
| 3,943,793 | 3/1976 | Stedman | 188/18 X |
| 4,222,462 | 9/1980 | Ottestad | 188/67 |

FOREIGN PATENT DOCUMENTS

| 650246 | 7/1964 | Belgium | 248/565 |
|---|---|---|---|
| 454773 | 3/1948 | Canada | 248/566 |
| 195765 | 2/1938 | Switzerland | 186/67 |
| 1123208 | 8/1968 | United Kingdom | 248/560 |

*Primary Examiner*—William H. Schultz
*Attorney, Agent, or Firm*—Browdy and Neimark

[57] ABSTRACT

An elastic support for a horizontally rotating washing machine or the like in which two spring support strut assemblies are disposed substantially in the middle of the machine and to either side of a vertical plane which includes the axis of rotation. Each of the spring strut assemblies is double-acting, i.e., it has an upper guide rod and a lower guide rod, each of which is surrounded by a compression spring. The top of the upper guide rod is attached to the washing machine housing and the bottom of the lower guide rod is attached to the base of the machine. The free ends of the guide rods move axially within a single guiding and damping casing which has internal passages for guiding the rods. The casing may consist of two or more parts and is so constructed that when the casing parts are clamped together with a variable force, the casing is deformed and a varying amount of radial pressure is applied by the walls of the passages to the surface of the guide rods, thereby causing a selectable amount of damping friction with respect to the axial motion of said guide rods.

11 Claims, 9 Drawing Figures

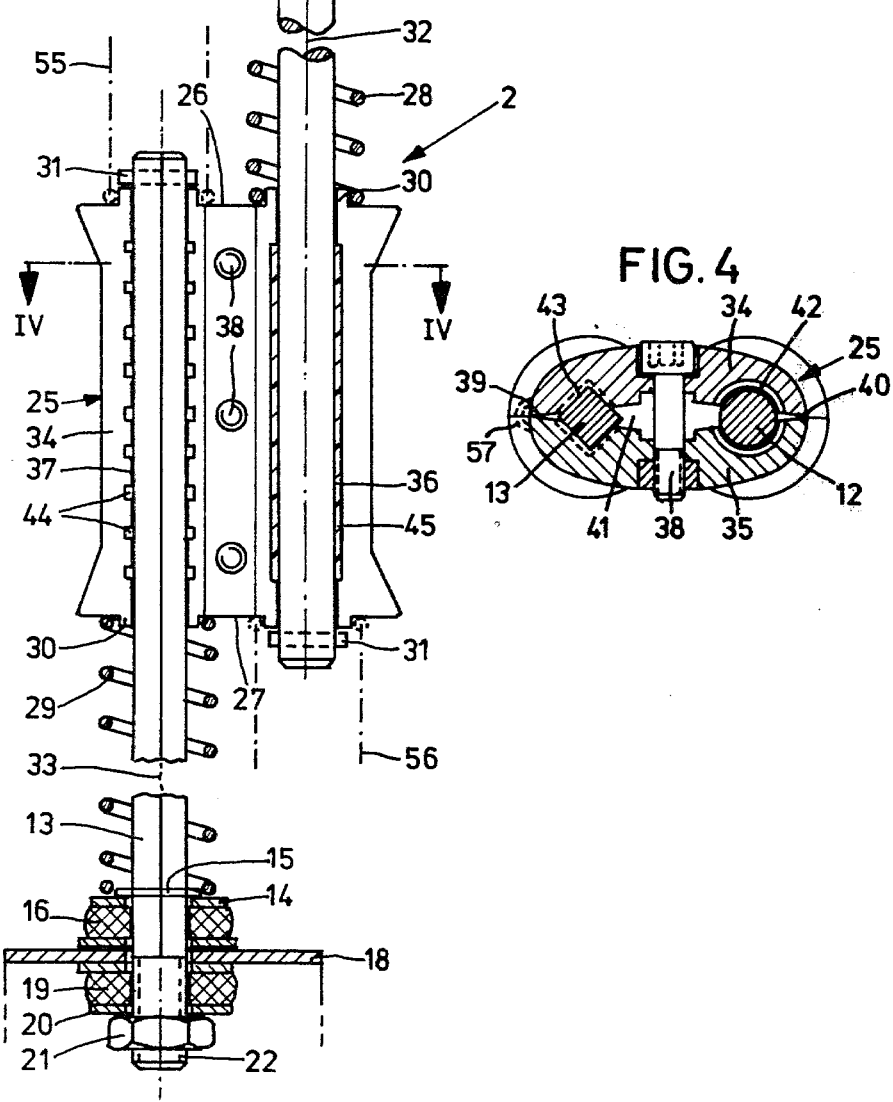

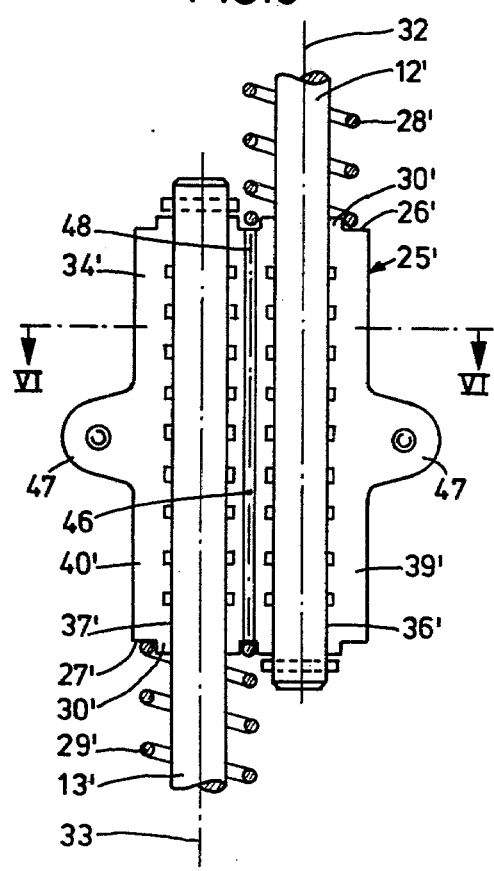
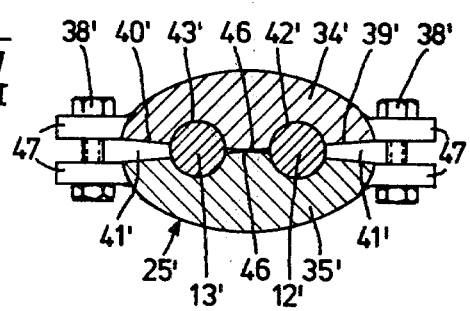

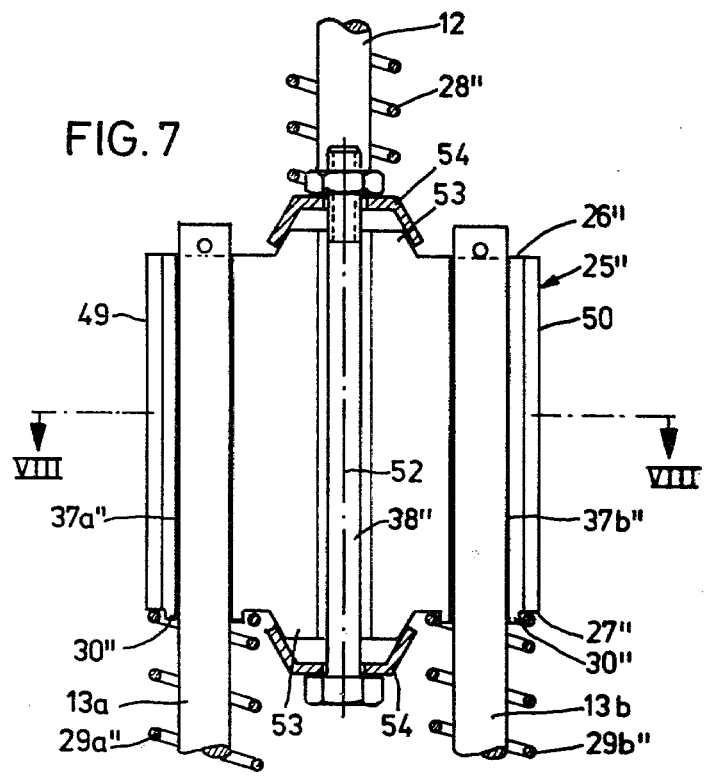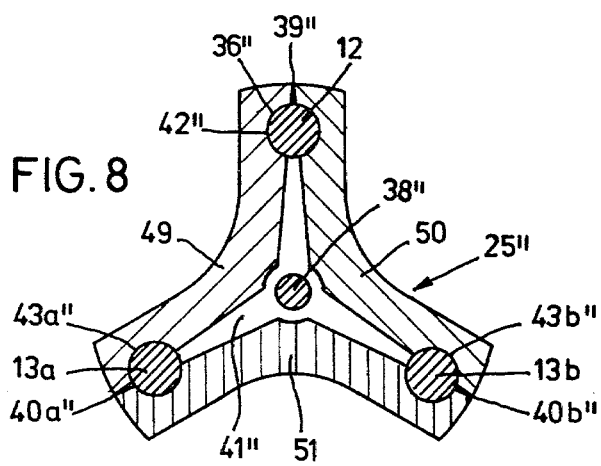

SPRING SUPPORT STRUT FOR DRUM-TYPE WASHING MACHINE

FIELD OF THE INVENTION

The invention relates to the resilient support for a horizontally rotating drum, in particular the drum of a washing machine.

BACKGROUND OF THE INVENTION AND PRIOR ART

It is known in the art to support a freely oscillating, horizontally rotating washing machine by at least two spring legs or struts which are disposed on either side of a vertical plane which contains the horizontal axis of rotation. Each of the spring struts includes a telescope assembly, one of whose elements is connected to the washing machine whereas the other is attached to a suitable base. A helical spring surrounding one or the other of the telescope elements provides the elastic restoring force. In a spring support described in the British Pat. No. 1,123,208, there is described a spring support strut which has proved to be so unexpectedly popular as to be used in an extremely large number of commercially available washing machines. In this known spring strut, the upper guide rod moves in a guide sleeve which serves at the same time as a friction damper. The guide sleeve or bushing is attached to the upper end of a tube which receives the guide rod when the spring strut is compressed. The spring itself is supported on an annular shoulder on the guide sleeve in the upper region of the tube.

One of the disadvantages of this known construction is that the axial path available for the spring support strut is relatively small. Furthermore, it has been found that the above-described construction is capable of some simplification.

OBJECT AND SUMMARY OF THE INVENTION

It is thus a principal object of the present invention to provide a spring support strut with substantially improved elastic and damping characteristics. This object is attained according to the invention by providing a spring support strut assembly comprising two basically independent spring legs, each having a guide rod and a compression spring. The two guide rods move axially in a substantially centrally disposed guide and damping casing which also serves to provide unilateral support for each of the compression springs.

The disposition according to the invention in which an upper and lower guide rod move axially in a common guiding and damping casing provides that at least two compression springs may be used which makes the elastic characteristics of the assembly substantially softer than would be the case if only a single spring were employed. This characteristic is especially advantageous for absorbing the oscillations of the relatively low masses of modern washing machines. Furthermore, the individual springs may be relatively short and are thus better able to resist buckling even for small helix diameters. The provision of at least two guide rods which move in the common guiding and damping casing makes available relatively large frictional surfaces which independently may generate substantial frictional forces. The two guide rods are parallel but non-coaxial and may thus be disposed vertically while still providing the desired lateral displacement when supporting a washing machine. The construction according to the invention retains the desirable feature of progressive increase of frictional forces when the washing machine being supported undergoes horizontal displacement. It is a feature of the invention to provide elastic support with very little noise generation.

A favorable feature of the invention is that the common guiding and damping casing is composed of at least two parts which meet in a plane containing the longitudinal axis of the guide rods, the two casing halves being held together by suitable fasteners.

The casing halves may be clamped together with varying degrees of force, thereby providing a capability to adjust the frictional forces exerted on the axially moving guide rods.

One or both of the guide rods may be given a non-circular cross section so as to prevent relative rotation of the common guiding and damping casing with respect to the guide rods.

Other advantages and characteristics of the invention will emerge from the description of a number of preferred exemplary embodiments taken in conjunction with the drawing.

BRIEF DESCRIPTION OF THE DRAWING

FIG. 3 is an axial section of parts of a spring support strut assembly according to the invention;

FIG. 4 is a section of FIG. 3 according to the line IV—IV;

FIG. 5 is a partial sectional view of a second embodiment of the invention;

FIG. 6 is a section of FIG. 5 along the line VI—VI;

FIG. 7 is a partial axial section of a third embodiment of the invention;

FIG. 8 is a section of FIG. 7 along the line VIII—VIII; and

FIG. 9 shows a second embodiment of the spring support strut structure shown in FIG. 3.

DESCRIPTION OF THE PREFERRED EMBODIMENTS

Figure 1:
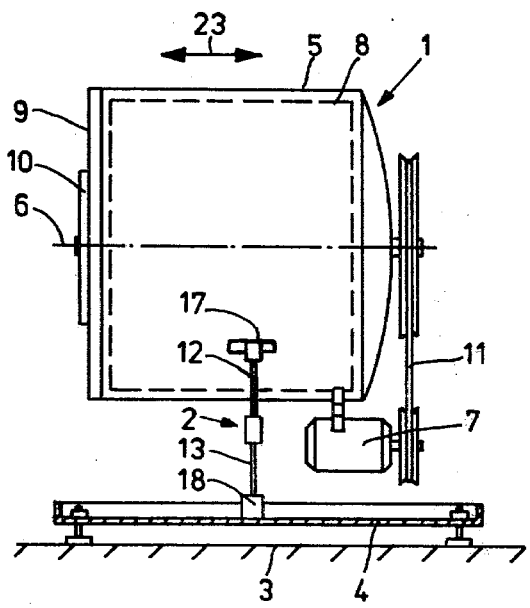
FIG. 1 is a schematic side view of a washing machine supported by spring struts according to the invention.

In FIG. 1 a washing machine 1 is shown to be supported on spring struts 2 which are attached to a base plate or frame 4 standing on a floor 3. The washing machine 1 consists basically of a water container 5 which surrounds a wash drum 8 which is capable of rotation around a horizontal axis 6 and which is driven, for example, by an electric motor 7. The laundry is placed in and removed from the drum 8 through a door 10 located at one of the end faces 9 of the housing 5. Rotary motion may be transmitted from the drive motor 7 to the drum 8 in any suitable manner, for example by means of a V-belt 11.

Figure 2:
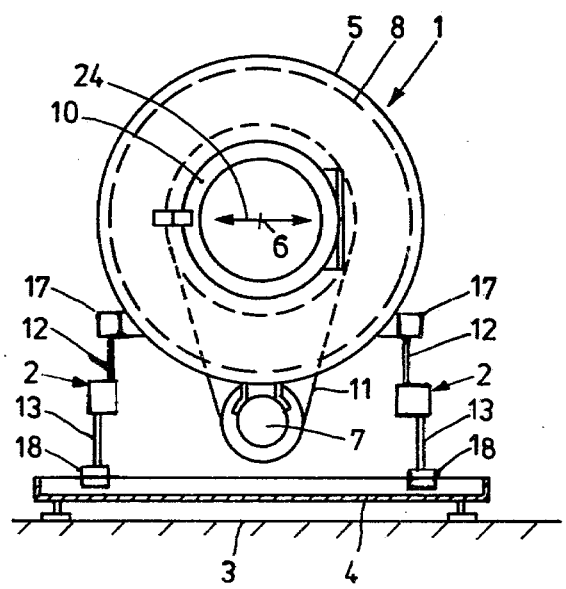
FIG. 2 is a front elevational view of the washing machine depicted in FIG. 1.

The spring struts 2 comprise basically an upper guide rod 12 and at least one lower guide rod 13. The upper guide rod 12 is attached to the water container or housing 5 and the lower guide rod 13 is attached to the base plate 4. The manner of attachment of these two guide rods may be the same. For example, as best seen in FIG. 3, a support disc 14 on the guide rods 12 or 13 is prevented from axial motion toward the center of the guide rod by a safety ring 15. An elastic element 16, for example made of rubber or some other suitable material and of rectangular or circular cross section, is supported by the ring 14. The free end of each of the rods 12, 13 is passed through suitable bores in a support bracket 17 on the water container 5 or, in the case of the rod 13, through a support bracket 18 on the base plate 4. In either case, the elastic elements 16 bear against the side of the bracket 17, 18 which faces the middle of the guide rods 12, 13. The protruding end of each of the guide rods 12, 13 carries a further and similarly embodied elastic element 19 which is secured by a disc 20. The entire assembly is held in place by a nut 21 which engages threads 22 placed at the ends of the guide rods 12, 13. The size, the material and the tension applied to the elastic assembly 14, 15, 16, 19, 20 determine the magnitude of the restoring forces which oppose any horizontal displacements along the arrow 23 in FIG. 1, i.e., in the direction of the rotational axis 6, as well as horizontal displacements along the arrow 24 (see FIG. 2) perpendicular thereto. The general construction of the elastic attachments of the support struts to the brackets 17, 18 is described, for example, in the British Pat. No. 1,123,208.

Located approximately in the center of each of the support struts is a guiding and damping casing 25 which contains provisions for axially parallel displacement of each of the guide rods 12, 13. The casing 25 also supports, on a top surface 26 and a bottom surface 27, respective helical compression springs 28,29 which are held in radial alignment by annular shoulders 30. The helical springs 28, 29 coaxially surround the respective upper and lower guide rods 12, 13 and their other ends are supported by the support disc 14. The ends of the guide rods 12, 13 protruding from the casing 25 carry a stop 31 which prevents the axial movement of the rods 12, 13 out of the casing 25. In particular, the stop 31 on the guide rod 12 prevents the upward motion of that rod while the stop 31 on the guide rod 13 limits the downward movement of the guide rod 13 out of the casing 25.

In the first embodiment of the guiding and damping casing 25 according to the invention, illustrated in FIGS. 3 and 4, the casing 25 is shown to be composed of two halves 34, 35 which are joined along a plane containing the axes of the guide rods 12, 13 to form a casing having a radial cross section resembling a shallow ellipse. When so joined, the two halves 34, 35 define axial guiding and damping passages 36, 37 which receive, respectively, guide rods 12, 13. In the embodiment illustrated in FIGS. 3, 4, the two casing halves 34, 35 are joined by fasteners 38, for example threaded bolts, which engage mating threaded parts to apply compressive stresses to the two halves of the casing 25. In order to attain a uniform distribution of such stresses, a plurality of, for example three, fasteners 38 may be provided.

As is best seen in FIG. 4, the two casing halves 34, 35 are so constructed as to make contact at the axially parallel edges 39, 40 in the stress-free configuration. In that state, the central region defines a free space 41 which extends up to the guiding and damping passages 36, 37. By suitable tightening of the fasteners 38, the two casing halves 34, 35 may be prestressed, so that the interior surfaces 42, 43 of the passages 36, 37, respectively, apply a predetermined pressure and thus frictional resistance with respect to the guide rods 12, 13. Thus, by suitable tightening or installation of the fasteners 38, the frictional force exerted by the casing 25 on the guide rods 12, 13 may be adjusted as desired. Suitably, the passages 36, 37 communicate with grease reservoirs 44 as is known in the art. The grease reservoirs 44 may be, for example, narrow, circumferential grooves as illustrated with respect to the passage 37 associated with lower guide rod 13 o FIG. 3. However, the reservoirs 44 may also be provided in the surface of additional frictional layers 45 as indicated with respect to the upper passage 36 which guides the upper guide rod 12. Relative rotation of the casing 25 with respect to the guide rods 12, 13 may be prevented by embodying one or both of the guide rods 12, 13 to exhibit a non-circular cross section. For example, as shown in the embodiment of FIGS. 3 and 4, the lower guide rod 13 may have a square cross section.

In a second exemplary embodiment of the invention, illustrated in FIGS. 5 and 6, the two guide rods 12',13' are relatively close together. The guiding and damping casing 25' is again subdivided into two casing halves 34', 35' which make contact in the narrow region between the two rods 12',13' along narrow bridges 46 while defining corresponding free volumes 41' in the vicinity of the axially parallel edges 39', 40'. In the vicinity of these edges 39', 40', the casing halves exhibit pairs of flanges 47 which, in the unstressed condition, are disposed at some distance from one another and which may be brought closer together by means of suitable fastening elements 38' which pass through corresponding bores and which may be, as in the previous case, threaded bolts, for example. The fastening elements 38' can be used to cause the interior surfaces 42', 43' of the guide bores 36', 37' to apply a selectable pressure against the guide rods 12',13'. The compression springs 28', 29' are helical springs disposed parallel to the central longitudinal axis 48 of the casing 25'. This axis lies in the plane defined by the two longitudinal axes 32, 33 of the guide rods 12', 13'. The radius of the helical springs 28', 29' is sufficient to surround the two rods 12', 13' coaxially. The annular ledge 30' at the top 26' or the bottom 27' of the casing 25' is constructed to perform the required support function. As was the case in the emodiment of FIGS. 3 and 4, the bores 36', 37' may be provided with grease chambers or frictional layers.

In a third embodiment of the invention according to FIGS. 7 and 8, the strut assembly includes an upper guide rod 12 and two lower guide rods 13a and 13b. All three guide rods are mutually axially parallel and are disposed at the corners of an equilateral triangle. The two lower guide rods 13a and 13b may be attached elastically to the base plate 4 of the washing machine in the manner already described above. A so-called two-legged support for a washing machine 1 for which the struts according to the present invention are especially suited is described, for example, in the U.S. Pat. No. 3,509,742. The two lower support rods may be attached to the base plate by a common elastic attachment as described in the aforementioned publication.

In the embodiment of FIGS. 7 and 8, the guiding and damping casing 25" consists of three identical casing parts 49, 50, 51 each of which spans in cross section an angle of approximately 120° as best seen in FIG. 8. Each of these casing parts constitutes one-half of two guiding and damping bores 36", 37a", 37b". The three casing parts 49, 50, 51 make stress-free contact at the axially parallel edges 39", 40a" and 40b" while defining a free space 41" in the center. The free space 41" has the shape of a three-cornered star, i.e., the interior surfaces of the casing parts lie at some distance from one another. Accordingly, when the casing parts 49, 50, 51 are clamped together and the free space 41" is reduced, it is possible to provide a selective compressive force exerted by the interior surfaces 42", 43a" and 43b" on the guide rods 12, 13a and 13b, respectively, thereby providing selective frictional resistance to the axial motion of the rods in their guide passages. In order to provide the selective clamping of the casing parts, the top 26" and the bottom 27" of the casing 25 are provided with clamping wedges 53 which define a frusto-conical clamping surface. This surface is engaged by a cup-shaped cone 54 at both the top and the bottom through which passes a fastening element 38", for example a bolt, which penetrates the entire length of the casing 25". When a mating nut is tightened on the bolt 38", the cup-shaped elements 54 are moved toward one another, thereby causing a radial stress to be applied to the clamping surfaces 53 and thus to the casing parts. This force causes a reduction of the free space 41", and thus a change in the frictional forces between the guide rods and the surrounding walls of the casing.

Each of the guide rods 12, 13a, 13b is surrounded by concentric helical springs 28", 29a" and 29b", respectively, which are supported on an annular shoulder 30" and axially against the top 26" or the bottom 27" of the casing.

A fourth variant of the invention is suggested in FIGS. 3 and 4 wherein there is provided a secondary compression spring 55, 56 which concentrically surrounds the second guide rod 13, 12. The second upper compression spring 55 is concentric to the lower guide rod 13 while the secondary lower compression spring 56 is concentric with respect to the upper guide rod 12. The support and fastening with respect to the upper bracket 17 and the lower bracket 18 on the base plate 4 may take place in any suitable manner. The parallel disposition of two compression springs on either side of the casing 25 brings the advantage that these springs may be softer and that the casing 25 is loaded symmetrically.

In all of the embodiments described above, the fastening or clamping element 38, 38', 38" was illustrated as a threaded bolt. However, any other suitable fastening means can be used, for example rivets which are installed with a precisely defined force, thereby causing a frictional force which can be selected at the time of manufacture. If the casing 25, 25', 25" is made from a thermoplastic synthetic material, the individual parts thereof may even be welded together at the time of manufacture.

It is also suitable to fabricate the individual halves or parts of the casing 25 in integral manner, for example as joined by a molded hinge such as 57 in FIG. 4.

A suitable feature of the invention is to provide guide rods 12, 13, 13a, 13b whose diameter or cross section varies along their axis, for example a diameter which increases from the point of attachment in a very gradual fashion which is too small to be illustrated in the drawing. If the oscillation amplitudes are very large, such a construction causes the damping to increase progressively.

In FIG. 9, which corresponds in shape with FIG. 3, the guide rods 12' and 13' are depicted, the diameter of which increases in the direction of the pivot points. The increase in diameter has been strongly exaggerated in the drawing for reasons of clarity.

The upper compression spring and the lower compression spring or springs may have different characteristics, i.e., different path-versus-force curves, which provides a progressive response of the spring strut according to the invention. This provision insures that when the washing machine is used in normal operation, i.e., with subcritical speeds, it is possible to use very short spring paths, without buckling of the supports, whereas when the washing machine is operated in the spinning cycle at high speeds with a greatly reduced internal mass, the softer springs with the reduced amount of reactive force come into play.

The foregoing description relates to preferred exemplary embodiments of the invention. Variants and modifications of these embodiments are possible without departing from the spirit and scope of the invention.

I claim:

1. An elastic support structure for a washing machine which includes a housing and a horizontally rotating drum, said support structure including a base and at least two spring support struts each attached resiliently to said base at the lower end thereof and to said housing at the upper end thereof, said spring support struts each including an upper guide rod and a lower guide rod, each of which is surrounded by a compression spring extending substantially the entire length of said guide rod, a centrally disposed guiding and damping casing for said upper and lower guide rods defining guide passages in which said upper and lower guide rods move axially and including means for providing frictional resistance between the walls of said passages and said guide rods, one end of each of said compression springs being supported by said casing.

2. An elastic support structure according to claim 1, wherein said guiding and damping casing is composed of at least two parts which are joined on one or more planes that include the longitudinal axis of each of said guide rods, said casing parts including fastening elements for joining said parts clampingly to define said casing.

3. An elastic support structure according to claim 2 further comprising means for varying the compressive force exerted by the internal surfaces of said passages against said guide rods, said means comprising said fastening elements joining said two casing parts clampingly together.

4. An elastic support structure according to claim 3, wherein said casing is so constructed as to define at least one internal free space and said fastening elements are disposed to cause a variation of the size of said free space, thereby altering the degree of compressive force exerted by said casing on said guide rods.

5. An elastic support structure according to claim 1, wherein said guiding and damping casing consists of two casing halves.

6. An elastic support structure according to claim 4, wherein said free space is disposed between said guide rods and said fastening elements pass therethrough.

7. An elastic support structure according to claim 5, wherein said casing halves are so constructed as to make contact between said guide rods and wherein free spaces are disposed between a guide rod and the adjacent axially parallel edge of said casing.

8. An elastic support structure according to claim 1, wherein each of said spring support struts includes at least three mutually parallel guide rods and wherein said casing is subdivided into at least three parts, there being provided means for applying a radial force to each of the casing parts to thereby cause the mutual approach thereof and the application of variable radial compressive forces on said guide rods.

9. An elastic support structure according to claim 1, wherein at least one of said guide rods has a non-circular cross section.

10. An elastic support structure according to claim 1, wherein at least one of said guide rods has a varying cross section whose diameter increases along the axis in the direction toward the resilient attachment thereof.

11. An elastic support structure according to claim 1, wherein said casing consists of at least two parts which are hinged together.

* * * * *